Patented July 25, 1939

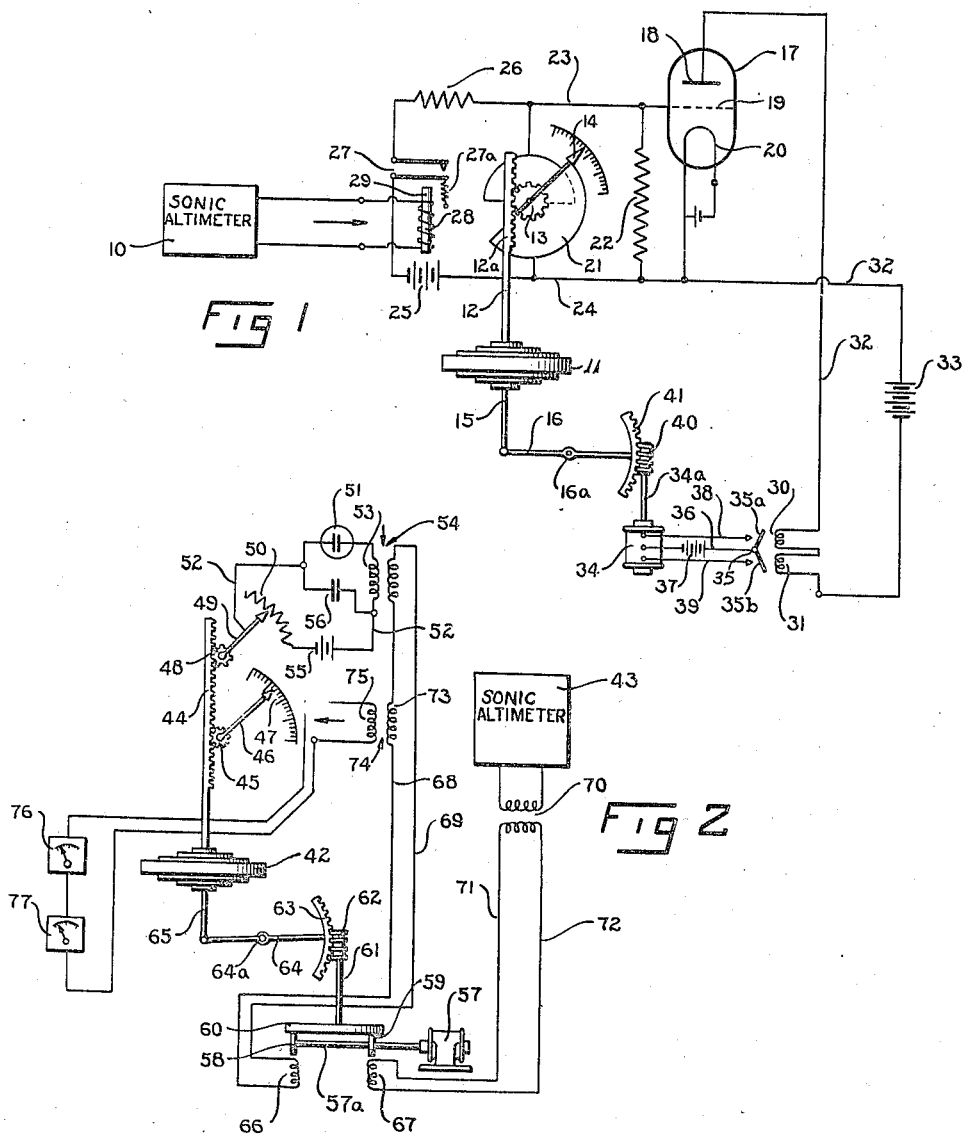

2,167,412

UNITED STATES PATENT OFFICE 2,167,412

MEANS FOR MEASURING THE ALTITUDE OF AIRCRAFT

Martin Baesecke, Berlin-Siemensstadt, Germany, assignor to Siemens Apparate und Maschinen Gesellschaft mit beschränkter Haftung, Berlin, Germany, a corporation of Germany Application April 6, 1938, Serial No. 200,526
In Germany November 13, 1934

8 Claims. (Cl. 73—4)

This invention relates to a means for measuring the altitude of aircraft and in particular to a means for obtaining a corrected altitude indication for distribution to a plurality of locations in a single aircraft or for distribution to a plurality of aircraft flying in a group.

It is highly desirable that an accurate indication of the altitude of an aircraft be obtained, for example, when the craft is controlled by altitude responsive means. It is also desirable and necessary in group flying, that the altitude of each craft concerned be gauged by that of the other members of the group.

One of the objects of the present invention is to provide novel means for obtaining an accurate indication of the altitude of an aircraft above ground rather than above a common datum.

A further object is to provide a novel means for indicating the altitude of an aircraft at a plurality of locations within the craft.

Another object is to provide a novel method for controlling the altimeters of a number of aircraft flying as a group wherein a master altimeter upon one of the craft constitutes a reference for the altimeters upon the other members of the group.

An additional object is to provide, for use in aircraft, an altimeter which continuously indicates the altitude relative to any predetermined datum, such as sea level, and which is automatically and periodically corrected by an altimeter which gauges the altitude relative to the earth directly beneath the aircraft.

The above and further objects and novel features of the invention will more fully appear from the following detailed description, when the same is read in connection with the accompanying drawing. It is to be expressly understood, however, that the drawing is for the purpose of illustration only and is not intended to define the limits of the invention, reference being had for this latter purpose to the appended claims.

In the drawing, wherein like reference characters refer to like parts throughout the several views, Fig. 1 is a schematic diagram of one embodiment of a master altitude gauge; and, Fig. 2 is a schematic diagram of a second embodiment of the master altitude gauge.

The form of the invention illustrated in the accompanying drawing by way of example is a device for providing at a plurality of locations on an aircraft a continuous indication of the flying altitude relative to the earth directly thereunder, rather than relative to a single datum, as sea level. At one of these locations, a master apparatus is provided comprising an altimeter which operates continuously, for example, one of the barometric type which measures the altitude relative to sea level and which is associated with a second altimeter, for example, one of the sonic type which is operated periodically only and measures the altitude relative to the earth beneath the craft. Through a comparison of the readings of the two gauges, the first one is automatically corrected. At each additional location upon the same craft, a repeating indicator, which is operatively connected to the barometric altimeter, may be employed. If it is desired to provide altitude indications at a plurality of locations each upon a different aircraft constituting a member of a group, then a master apparatus as above described may be employed upon one of the aircraft. Upon the other craft, a continuously operating single altimeter may be used, for example, a barometric altimeter which, by radio communication at predetermined intervals, may be compared to the master apparatus and corrected. While the sonic gauge is operated only from time to time to correct the barometric gauges associated therewith, the latter will provide a sufficiently accurate running indication of the altitude.

In the form illustrated in Fig. 1, the novel altitude measuring apparatus comprises a sonic altimeter 10, known per se, which by measuring the sounding interval, i. e., the length of time required by a sound impulse, generated at the plane, to strike the earth and return, determines the altitude of the craft. A continuously operating barometric gauge is employed in conjunction therewith having a collapsible and expansible corrugated metal vessel 11, to one extremity of which is connected a rod 12, which in turn by a rack 12a and a gear 13 controls a pointer 14. For a purpose to be later explained a rod 15 is centrally attached to the opposite extremity of vessel 11 and operatively connected to a lever 16 which is pivotally mounted at 16a.

In order that the indications of the barometric gauge may be automatically corrected by the altitudes obtained periodically at gauge 10, a thermionic tube circuit is employed wherein a discrepancy between the gauge indications changes the grid current of said circuit and actuates a mechanism to correct the barometric gauge. A conventional thermionic tube 17 is provided having a plate 18, a grid 19, and a filament 20. A condenser 21 is connected in the grid circuit, in a known manner, in parallel with a resistance 22 across leads 23, 24. Condenser 21 is operatively connected to the shaft of gear 13 such that the capacity thereof is a function of the movement of the barometric vessel 11. The condenser is charged by a constant potential battery 25, through a resistance 26, when the grid circuit is closed by a switch 27 which is normally held in an open position by a spring 27a, and is controlled by a solenoid 28 having a plunger 29. Suitable means (not shown) associated with gauge 10 cause solenoid 28 to be energized, and the grid circuit thus to be closed, during the sounding interval of gauge 10.

The means for adjusting the barometric gauge when the grid potential changes comprises a pair of relays 30, 31 in series upon a lead 32 in the anode circuit. Each of said relays is operable at a different current and is in series with the constant potential battery 33 which under normal conditions provides a current which is between those values necessary to operate said relays. The relays control the direction of operation of a motor 34, having a shaft 34a, by means of a double arm switch 35 having arms 35a and 35b which are respectively associated with relays 30, 31. Arms 35a, 35b are connected to motor 34 by a lead 36 through an energy source 37 and may engage a lead 38 or 39, respectively, in accordance with which relay is actuated, to produce right or left rotation of shaft 34a. Shaft 34a is operatively connected to vessel 11 by means of a worm 40 thereon which meshes with a worm wheel portion 41 which is rigidly attached to the above-described lever 16 and linked to vessel 11 by the rod 15.

In order that the altitude indication vessel 11 may be distributed to a plurality of locations in a single aircraft, the torque of the shaft of pointer 14 may be amplified by suitable means and distributed, for example, by synchronous motors in a manner as shown for example in the U. S. Patent to Reichel et al. 2,038,059, dated April 21, 1936. Instead of a continuous automatic distribution, the additional indicators may be of the barometric type and may be manually adjusted to agree with the double apparatus. Thus, where all the gauges are at the same altitude, a correction for one gauge is applicable to all gauges. However, in the case of group flying, the circumstances are different because the members of the group are frequently at different altitudes and in order for a correction, as determined by the master gauge upon one of the craft, to be applicable to the barometric gauge on the other craft, all of said barometric gauges must possess the same characteristics and be adjusted alike at the beginning of the flight. As above mentioned, the indications of the various single barometric altimeters in the separate aircraft may be corrected to agree with the master by periodic radio signals from the craft having said master apparatus.

In operation, when flying at a given altitude, an altitude indication is obtained from the sonic gauge 10. During the sounding interval, the grid circuit of tube 17 is closed by solenoid 28. A charge is built up in condenser 21 which is dependent upon, first, said sounding interval, and second, the overlapping area of the condenser plates, which area is, in turn, a function of the barometric altitude. This condenser charge controls the grid potential and is initially predetermined at such a value that the plate current, governed thereby, holds relays 30, 31 in the open position, i. e., the current is between those values which will actuate said relays. If the barometric altitude is in agreement with the altitude determined by gauge 10 then the charge upon said condenser will not alter the grid potential from the predetermined value and the motor 34 will not be energized, hence no adjustment will be communicated to vessel 11. If the altitude, for example, increases then the sounding interval also increases and the capacity or overlapping plate area of the condenser should decrease correspondingly in order that the charge upon the condenser will remain constant at the predetermined value. However, if an altitude change occurs at gauge 10, and this change is not followed by vessel 11, the discrepancy will be reflected in a change of the charge upon the condenser. This change, in turn, will disturb the constant plate current and will actuate either relay 30 or 31 in accordance with an increase or decrease in said current. Motor 34 will thus be energized and will adjust, by means of the lever 16 and rod 15, the vessel 11 and the capacity of condenser 21, such that the proper grid potential is restored. When the grid potential is restored, the plate current will regain its former value and motor 34 will come to rest.

In the form shown in Fig. 2, a barometric gauge having a vessel 42 is employed in conjunction with a second periodically operated sonic altitude gauge 43, which, instead of determining the altitude from a single sounding interval, as in the first embodiment, directs a series of sound impulses against the earth and obtains the altitude by determining the frequency of said impulses when they are transmitted and received simultaneously. This type of altitude gauge is known per se and constitutes no part of the invention. The altitude responsive frequency may control, by suitable means, the frequency of an electric current and, in a manner to appear hereafter, also control said barometric gauge.

Centrally attached to the vessel 42 of the gauge is a rack 44 meshing with a gear 45 which positions a pointer 46 upon an altitude scale 47. A second gear 48 also meshes with rack 44 and controls, by an arm 49, a variable resistance 50 which lies in the circuit of a glow lamp 51 with which, for example, means are associated whereby the current is periodically turned on and off. Arm 49 is connected to resistance 50 by a lead 52 on which, in series, are said lamp, a primary coil 53 of a transformer 54, and a suitable source of electric energy 55. A condenser 56 is connected in parallel with said lamp and coil and in series with lead 52, said source 55, resistance 50 and lead 52. Condenser 56 is charged by the source 55. As soon as the condenser 56 builds up to the proper value, the glow lamp 51 "breaks down" and the circuit is closed. Once the circuit is closed, condenser 56 discharges, thereby setting up a source of current through coil 53. As the condenser continues to discharge, its charge reaches a value below the "break down" point of the glow lamp and the circuit is broken. The condenser again charges and the cycle is repeated. The number of said discharges determines the frequency. As the value of resistance 50 increases, the charging time of condensor 56 increases and hence the frequency decreases and as the value of resistance 50 decreases, the charging time of condenser 56 decreases and the frequency increases. The frequency of the flashes of lamp 51 and of the current in the connected circuit is therefore controlled by resistance 56 and hence by the barometric altitude.

In order that any descrepancies between the indications of the gauge including vessel 42 and the gauge 43 may be eliminated, novel means are provided for adjusting the former to agree with the latter, comprising means for comparing the frequency of the current in the above-described flashing circuit with the frequency of a current from the gauge 43. The novel means comprise, for example, a constant speed electric motor 57 having a shaft 57a upon which are two rollers 58 and 59 which are in contact with a friction disc 60 and situated equidistant from the center thereof. The two rollers, when rotated will tend to revolve disc 60 in opposite directions at equal speeds. Disc 60 is operatively connected at vessel 42 by a centrally disposed shaft 61 having a worm 62 thereon, meshing with a worm wheel sector 63 which is rigidly attached to a lever 64 pivotally mounted at 64a. Lever 64 by means of a rod 65 centrally attached to vessel 42, opposite rod 44, is linked to said vesssel.

Rollers 58, 59 normally may rotate freely upon shaft 57a but electro-magnetic couplings (not shown) are provided thereon which cause the rollers to grip said shaft. The electro-magnetic couplings may be fed over suitable slip rings (not shown) upon the rollers. The exciter windings for said couplings are schematically represented by coils 66, 67. The former coil is in connection with the secondary of transformer 54 by means of leads 68, 69 and coil 67 in turn is connected to gauge 43 through a transformer 70 by leads 71, 72.

In order that a plurality of altitude indicators may be controlled by the gauge including vessel 42, a primary coil 73 of a transformer 74 is connected in lead 68. A secondary coil 75 of the transformer is connected to a plurality of indicators, for example, frequency meters 76, 77 which are calibrated to measure altitude.

In operation, the gauge 43 is actuated during a sufficient length of time to obtain an indication of the altitude above ground. A pulsating current will be produced in coil 67 having a frequency which is responsive to this indication. The barometric gauge by controlling the variable resistance 56 governs the frequency of the flashing of lamp 51, and hence the frequency of the current in transformers 54 and 74 and in coil 66. These altitude responsive frequencies are compared by means of the coils 66, 67 which, when energized electro-magnetically couple rollers 58, 59 to shaft 57a and cause disc 60 to rotate. If the frequency of the two currents is equal, the electro-magnetic couplings in the rollers will be energized equal lengths of time during, for example, one second, and the summation of the impulses tending to rotate disc 60 clockwise will equal the summation of impulses tending to rotate the disc in the opposite direction with a net result of zero rotation. However, if the frequency of the current in one coil becomes greater than that in the other, responsive to a difference in the altitude indications, the roller associated with the coil having the higher frequency will be coupled to shaft 57a the greater length of time during any given period. Consequently, disc 60 will be rotated in accordance with the difference in said frequencies and will adjust vessel 42 and resistance 56 to bring the frequency of coil 66 into agreement with that of coil 67 and thus to bring the indication of vessel 42 into coincidence with that of altimeter 43.

There is thus provided a novel altitude gauging apparatus which provides a continuous corrected altitude above ground. The device is adapted for use in group flying wherein the gauges of the members of the group may be corrected by reference to a master apparatus. The device is also well adapted for controlling and adjusting a plurality of altitude indicators upon a single craft. The novel apparatus is automatic in operation and simple in construction and furthermore is well adapted for use aboard aircraft.

Although only two embodiments have been illustrated and described in detail, it is to be expressly understood that the invention is not limited thereto, and that various changes may be made in the design and arrangement of the parts illustrated without departing from the spirit and scope of the invention as the same will now be understood by those skilled in the art. For a definition of the limits of the invention, reference will be had primarily to the appended claims.

What is claimed is:

1. The combination with an altimeter for measuring the altitude of an aircraft relative to a single datum, a second altimeter measuring altitude relative to the earth beneath the aircraft, and means operable in response to a discrepancy between the indications of said altimeters for bringing the indication of the first-named altimeter into coincidence with the indications of the second-named altimeter.

2. The combination with an altimeter measuring altitude relative to a single datum, of a second altimeter measuring altitude relative to the surface of the earth beneath said altimeters, means for adjusting the indication of the first-named altimeter, and means for actuating said adjusting means in response to differences in the indications of said altimeters.

3. The combination with a barometric altitude gauge of a sonic altitude gauge, means for producing an electric impulse at a predetermined potential when the indications of said gauges are in coincidence, said means being adapted for changing the potential of said impulse in response to discrepancies between the indications of said gauges, and means operable in response to changes in said potential to adjust the indication of said barometric gauge.

4. The combination with a gauge for measuring the vertical distance of a vehicle from a single datum, of a second gauge for measuring the vertical distance of said vehicle from the earth, means for producing a series of impulses having a frequency responsive to the indication of the first-named gauge, means for producing a series of impulses having a frequency responsive to the indication of the second-named gauge, means for comparing the frequencies of impulses produced by said means, and means responsive to discrepancies in said frequencies for adjusting the indication of said first-named gauge.

5. The combination with a continuously operating altimeter for measuring altitude relative to a single datum of a second altimeter for measuring altitude relative to the earth, means for producing impulses at a frequency responsive to the indications of the first-named altimeter, means for producing impulses at a frequency responsive to the indications of the second-named altimeter, and means for adjusting said first-named altimeter in response to the difference between said frequencies.

6. In apparatus of the class described, a barometric altimeter, a sonic altimeter, means for producing current impulses at a frequency responsive to the indications of the barometric altimeter, means for producing current impulses at a frequency responsive to the indications of the sonic altimeter, a servo-motor, means for operatively connecting said motor to the barometric altimeter in response to the difference between said frequencies whereby said barometric altimeter is brought into agreement with said sonic altimeter, a plurality of altitude indicators, and means for operatively connecting said indicators to said barometric altimeter.

7. The combination with an altimeter for gauging the altitude of an aircraft above a single datum, of a second altimeter for gauging the altitude of an aircraft relative to the earth directly therebeneath, a variable condenser, means for controlling the capacity of said condenser in accordance with the indications of the first-named altimeter, means for controlling the charging time of said condenser in accordance with the indications of said second altimeter whereby a constant potential across said condenser is maintained when the indications of said altimeters are in coincidence, and means operable in accordance with a change in said potential for adjusting the indication of said first-named altimeter to agree with that of said second altimeter.

8. The combination with an altimeter for measuring the altitude of an aircraft relative to a single datum, a second altimeter measuring altitude relative to the earth beneath the aircraft, and means operable in response to a discrepancy between the indications of said altimeters for bringing the indication of one of said altimeters into coincidence with the indication of the other.

MARTIN BAESECKE.